US012626082B2

(12) United States Patent
Hirai et al.

(10) Patent No.: US 12,626,082 B2
(45) Date of Patent: May 12, 2026

(54) SERVICE PROVIDING SYSTEM, SERVICE PROVIDING DEVICE, PRINTING APPARATUS, AND METHOD OF CONTROLLING SERVICE PROVIDING SYSTEM

(71) Applicant: SEIKO EPSON CORPORATION, Tokyo (JP)

(72) Inventors: Yasuaki Hirai, Shiojiri (JP); Naoshi Furuta, Shiojiri (JP); Tetsuya Kobayashi, Shiojiri (JP); Ayana Kodama, Matsumoto (JP); Hiromi Nishimura, Shiojiri (JP); Tatsuo Asada, Matsumoto (JP); Noriyuki Nukaga, Matsumoto (JP); Satoshi Jobetto, Hiji-Machi (JP); Fumika Matsuzaki, Matsumoto (JP); Yoko Chino, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 62 days.

(21) Appl. No.: 18/418,041

(22) Filed: Jan. 19, 2024

(65) Prior Publication Data

US 2024/0256813 A1 Aug. 1, 2024

(30) Foreign Application Priority Data

Jan. 20, 2023 (JP) ................................. 2023-007115

(51) Int. Cl.
*G06K 15/00* (2006.01)

(52) U.S. Cl.
CPC ................................. *G06K 15/4075* (2013.01)

(58) Field of Classification Search
CPC . G06K 15/4075; G06F 3/1239; G06F 3/1285; G06F 3/1219; B41J 2/17566
See application file for complete search history.

(56) References Cited

U.S. PATENT DOCUMENTS

| | | | |
|---|---|---|---|
| 2017/0063646 A1 | 3/2017 | Kawai | |
| 2022/0009241 A1* | 1/2022 | Azechi | B41J 2/17509 |
| 2022/0100437 A1* | 3/2022 | Hattori | H04N 1/00411 |
| 2023/0311529 A1* | 10/2023 | Suzuki | B41J 2/17546 |
| | | | 347/86 |
| 2023/0382121 A1* | 11/2023 | Hayashi | G06Q 30/0627 |

FOREIGN PATENT DOCUMENTS

JP 2017-049767 A 3/2017

\* cited by examiner

*Primary Examiner* — Iriana Cruz
(74) *Attorney, Agent, or Firm* — WORKMAN NYDEGGER

(57) ABSTRACT

A service providing system includes a providing unit that delivers a dedicated ink cartridge to be installed in place of a non-dedicated ink cartridge that was installed in the multifunction machine 1 before subscribing to the service, a server memory that stores the amount of ink remaining in the non-dedicated ink cartridge, and a permission unit that permits printing using the dedicated ink cartridge according to the remaining amount of ink stored in the server memory when the user withdraws from the service.

8 Claims, 8 Drawing Sheets

FIG. 2

SERVICE PROVIDING SYSTEM, SERVICE PROVIDING DEVICE, PRINTING APPARATUS, AND METHOD OF CONTROLLING SERVICE PROVIDING SYSTEM

The present application is based on, and claims priority from JP Application Serial Number 2023-007115, filed Jan. 20, 2023, the disclosure of which is hereby incorporated by reference herein in its entirety.

BACKGROUND

1. Technical Field

The present disclosure relates to a service providing system, a service providing device, a printing apparatus, and a method of controlling the service providing system.

2. Related Art

In the related art, systems have been known that provide a user of a printing apparatus with a container containing printing material used for the printing apparatus to perform printing. For example, JP-A-2017-049767 discloses a system for delivering a specific ink cartridge to a printer user. The system disclosed in JP-A-2017-049767 puts the printing apparatus in a state in which the specific ink cartridge cannot be used when a contract for a service for delivering the specific ink cartridge is canceled.

According to JP-A-2017-049767, when a user subscribes to a service, the installed ink cartridge is replaced with a specific ink cartridge, and when the service contract is canceled, the specific ink cartridge is unusable. In this way, in the related art, it is not possible to perform printing for the remaining amount of the printing material contained in the container installed before the user subscribes to the service after the user withdraws from the service.

SUMMARY

According to an aspect of the present disclosure, in a service providing system that provides a service for delivering a container containing printing material used for a printing apparatus to perform printing, the service providing system includes a providing unit that delivers a second container that is a container to be installed in place of a first container that is a container that was installed in the printing apparatus before subscribing to the service, a storage unit that stores remaining amount data indicating an amount of printing material remaining in the first container, and a permission unit that permits, at a time of withdrawal from the service, the printing apparatus to perform printing using the second container according to a remaining amount indicated by the remaining amount data stored in the storage unit.

According to another aspect of the present disclosure, in a service providing device that provides a service for delivering a container containing printing material used for a printing apparatus to perform printing to a user of the printing apparatus, the service providing device includes a providing unit that delivers a second container that is a container to be installed in place of a first container that is a container that was installed in the printing apparatus before the user subscribes to the service, and a permission unit that acquires, from a storage unit that stores remaining amount data indicating an amount of printing material remaining in the first container, the remaining amount data at a time of withdrawal from the service, and permits the printing apparatus to perform printing using the second container according to a remaining amount indicated by the remaining amount data.

According to still another aspect of the present disclosure, in a printing apparatus that performs printing using a container containing printing material, the printing apparatus includes a storage unit that stores remaining amount data indicating a remaining amount when a user of the printing apparatus subscribes to a service for delivering the container, the remaining amount being an amount of printing material contained in a first container that is a container that was installed in the printing apparatus before the user subscribes to a service, and a permission unit that permits, at a time of withdrawal, printing using a second container that is a container to be installed in place of the first container according to a remaining amount indicated by the remaining amount data stored in the storage unit.

According to still another aspect of the present disclosure, in a method of controlling a service providing system that provides a service for delivering a container containing printing material used for a printing apparatus to perform printing, the method includes delivering a second container that is a container to be installed in place of a first container that is a container that was installed in the printing apparatus before subscribing to the service, storing remaining amount data indicating an amount of printing material contained by the first container, and permitting the printing apparatus to perform printing using the second container according to a remaining amount indicated by the stored remaining amount data at a time of withdrawal from the service.

BRIEF DESCRIPTION OF THE DRAWINGS

FIG. 2 is a diagram showing the configuration of a multifunction machine.

DESCRIPTION OF EMBODIMENTS

1. First Embodiment

1-1. Configuration of Service Providing System

Figure 1:
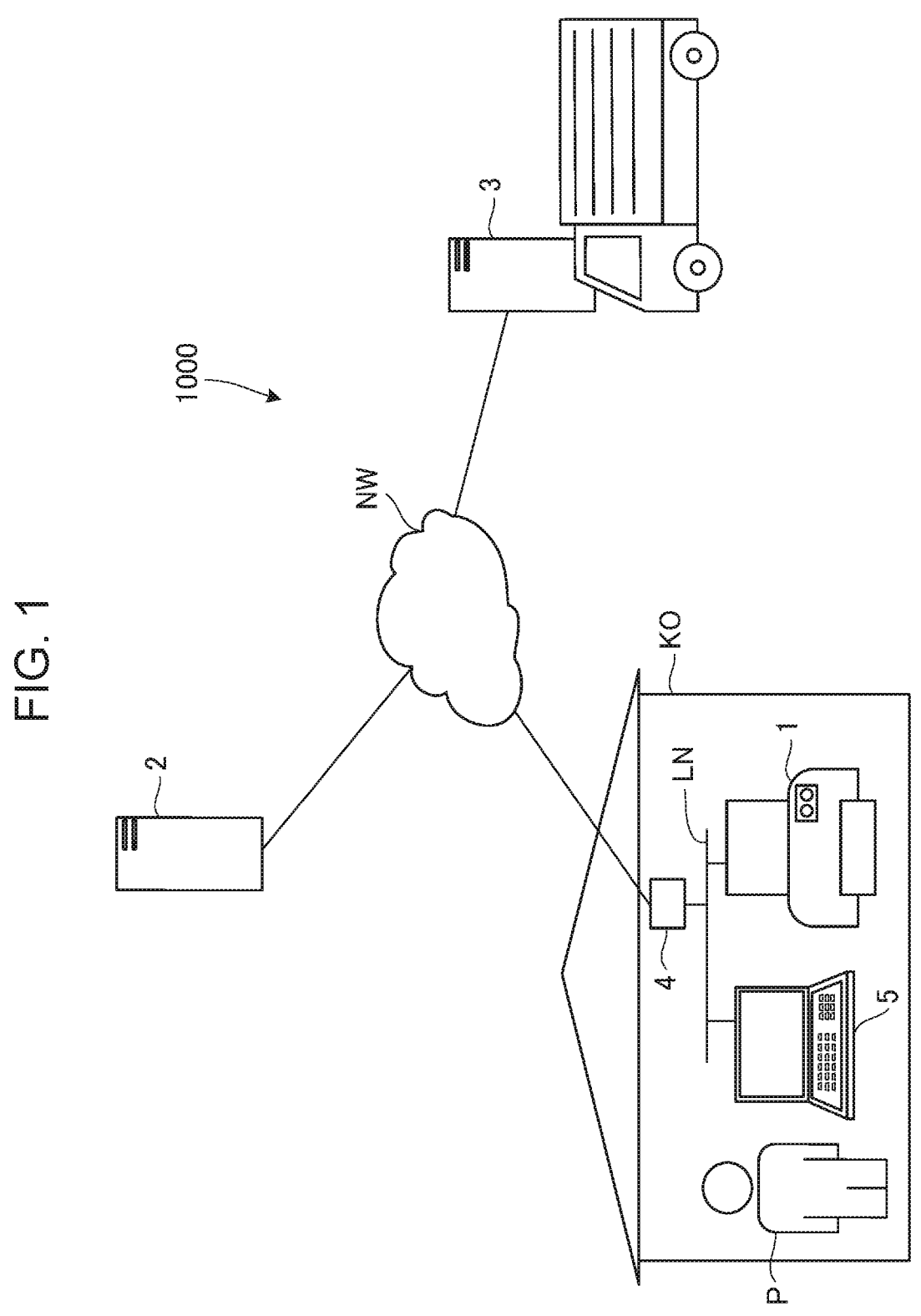
FIG. 1 is a diagram showing the configuration of a service providing system.

FIG. 1 is a diagram showing the configuration of a service providing system 1000. The service providing system 1000 is a system that provides a subscription-based service. In this service, in a case where a user P of a multifunction machine 1 has subscribed to the service, when the amount of ink remaining in an ink cartridge 121 used for printing by the multifunction machine 1 is low, the ink cartridge 121 is delivered to the user P. The multifunction machine 1 corresponds to an example of a "printing apparatus". The ink cartridge 121 corresponds to an example of a "container". The ink contained in the ink cartridge 121 corresponds to an example of "printing material".

In the following description, the ink cartridge 121 provided by the service will be referred to as a "dedicated ink cartridge" and will be given the reference numeral "121A". Furthermore, in the following description, the ink cartridge 121 that is not provided by the service is referred to as a "non-dedicated ink cartridge" and is given the reference numeral "121B". The non-dedicated ink cartridge 121B is the ink cartridge 121 purchased by the user P at a store such as an electronics retail store, for example. The dedicated ink cartridge 121A corresponds to an example of a "second container". The non-dedicated ink cartridge 121B corresponds to an example of a "first container".

The service providing system 1000 includes a management server 2 that manages a service. This management server 2 corresponds to an example of a "service providing device". An example of the matters managed by the management server 2 includes the amount of ink remaining in the dedicated ink cartridge 121A. The management server 2 is a server device connected to a communication network NW. The communication network NW is a network such as the Internet, a private circuit, or a public circuit.

The management server 2 communicates with a delivery server 3 via the communication network NW. The delivery server 3 is a server device that instructs a delivery person to deliver goods. The delivery server 3 is owned by a delivery company, for example, and gives a delivery instruction to a delivery person who is an employee of the delivery company.

Although each of the management server 2 and the delivery server 3 is represented by one block in each figure, this does not necessarily mean that each server is configured by a single server device. For example, each of the management server 2 and the delivery server 3 may include a plurality of server devices with different processing content. The management server 2 and the delivery server 3 may be configured by the same server device.

The service providing system 1000 includes the multifunction machine 1. The multifunction machine 1 is a device that is referred to as a multi function peripheral (MFP), and can perform various processes such as printing and scanning. The multifunction machine 1 has the ink cartridge 121 installed therein and performs printing by receiving ink from the installed ink cartridge 121. The multifunction machine 1 is connected to a local network LN constructed by a communication device 4 and communicates with devices connected to the communication network NW via the communication device 4. Further, the multifunction machine 1 communicates with a terminal device 5 connected to the local network LN.

The communication device 4 is provided at a delivery destination KO of the dedicated ink cartridge 121A. The communication device 4 is connected to the communication network NW and communicates with the management server 2 via the communication network NW. The communication device 4 functions as an interface device that connects the multifunction machine 1 and the terminal device 5 to the communication network NW.

The service providing system 1000 includes the terminal device 5. The terminal device 5 is a computer. The terminal device 5 is connected to the local network LN and communicates with the multifunction machine 1 connected to the local network LN and the management server 2 connected to the communication network NW. Although the terminal device 5 shown in FIG. 1 is a laptop computer, it may be a desktop computer or a tablet computer. When the terminal device 5 can be connected to the communication network NW without going through the local network LN, the terminal device 5 may communicate with the management server 2 without going through the local network LN. Further, the terminal device 5 may communicate with the multifunction machine 1 using a communication method that performs one-to-one communication. An example of this communication method is a direct communication method such as Wi-Fi Direct. Wi-Fi is a registered trademark.

Figure 2:
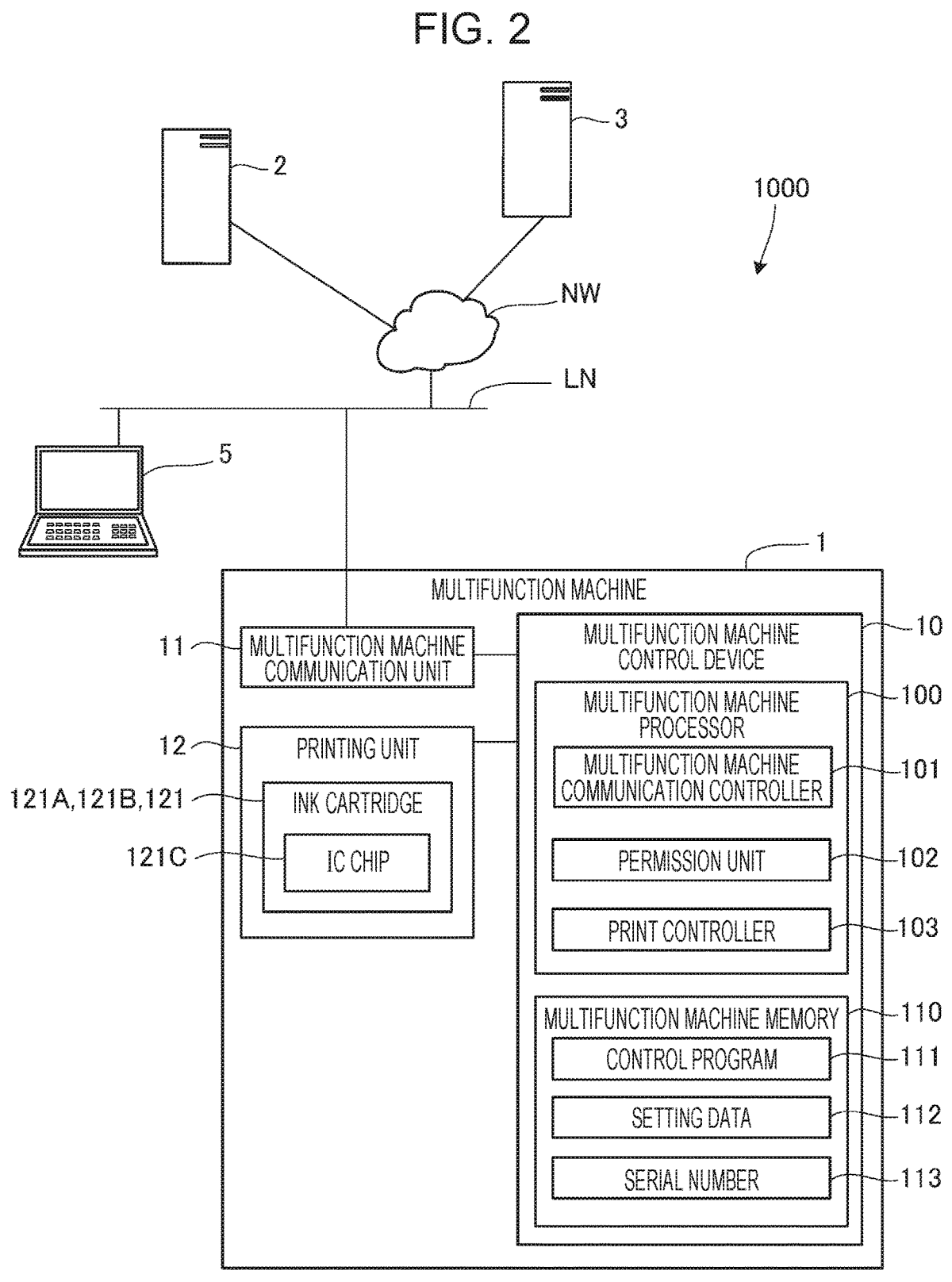

Next, the configurations of the multifunction machine 1, the terminal device 5, and the management server 2 will be described. First, the configuration of the multifunction machine 1 will be described. FIG. 2 is a block diagram showing the configuration of the multifunction machine 1.

1-2. Configuration of Multifunction Machine

The multifunction machine 1 includes a multifunction machine control device 10, a multifunction machine communication unit 11, and a printing unit 12. The multifunction machine control device 10 includes a multifunction machine processor 100 including one or a plurality of central processing units (CPUs), micro-processing units (MPU) or application specific integrated circuits (ASIC), and the like, and a multifunction machine memory 110, and controls the respective units of the multifunction machine 1.

The multifunction machine memory 110 stores a program executed by the multifunction machine processor 100 and data processed by the multifunction machine processor 100. The multifunction machine memory 110 stores a control program 111 executed by the multifunction machine processor 100, setting data 112, a serial number 113, and various other pieces of data. The multifunction machine memory 110 has a non-volatile storage area. The multifunction machine memory 110 may include a volatile storage area and constitute a work area of the multifunction machine processor 100. The multifunction machine memory 110 is composed of, for example, a read only memory (ROM) and a random access memory (RAM).

The setting data 112 is data related to the setting of the multifunction machine 1. The setting data 112 has a combination of a setting item and a setting value for each setting item. The serial number 113 is an identification number for identifying the multifunction machine 1.

The multifunction machine communication unit 11 includes communication hardware conforming to a predetermined communication standard such as connectors and communication circuits, and communicates with devices connected to the local network LN and the communication network NW under the control of the multifunction machine control device 10. That is, the multifunction machine communication unit 11 communicates with the terminal device 5 and the management server 2.

The printing unit 12 includes an ink jet head that ejects ink onto a print medium to form dots, a carriage that moves the ink jet head in the scanning direction, a carriage drive motor that drives the carriage, a transport mechanism that transports the print medium, a mechanism in which the ink cartridge 121 is installed and a maintenance mechanism that maintains the ink jet head. The printing unit 12 prints an image on a print medium by performing printing under the control of the multifunction machine control device 10.

The ink cartridge 121 includes an integrated circuit (IC) chip 121C. Each time printing is performed, the multifunction machine control device 10 acquires the amount of ink remaining in the ink cartridge 121 from the detection value by the remaining amount detection sensor provided for the ink cartridge 121 or the amount of ink used for printing, records the remaining amount of ink on the IC chip 121C of the installed ink cartridge 121. Note that information indicating that the cartridge is the dedicated ink cartridge 121A is recorded on the IC chip 121C of the dedicated ink cartridge 121A.

The multifunction machine processor 100 functions as a multifunction machine communication controller 101, a permission unit 102, and a print controller 103 by reading out and executing the control program 111 in the multifunction machine memory 110.

The multifunction machine communication controller 101 communicates with the terminal device 5 and the management server 2 via the multifunction machine communication unit 11.

When the dedicated ink cartridge 121A is installed in the multifunction machine 1, the multifunction machine communication controller 101 transmits a group of dedicated remaining amount data including a plurality of pieces of dedicated remaining amount data to the management server 2 every time the multifunction machine 1 performs printing. The dedicated remaining amount data is data indicating the amount of ink remaining in the dedicated ink cartridge 121. The multifunction machine communication controller 101 of the present embodiment transmits dedicated remaining amount data of each of C (cyan), M (magenta), Y (yellow), and K (black) to the management server 2. The serial number 113 stored in the multifunction machine memory 110 is added to the dedicated remaining amount data group transmitted to the management server 2.

When the non-dedicated ink cartridge 121B is installed in the multifunction machine 1, the multifunction machine communication controller 101, upon receiving a request from the management server 2, transmits the non-dedicated remaining amount data group including a plurality of pieces of non-dedicated remaining amount data to the management server 2. The non-dedicated remaining amount data is data indicating the amount of ink remaining in the dedicated ink cartridge 121. The multifunction machine communication controller 101 of the present embodiment transmits the non-dedicated remaining amount data of each of CMYK to the management server 2. The serial number 113 stored in the multifunction machine memory 110 is added to the non-dedicated remaining amount data group transmitted to the management server 2. The multifunction machine communication controller 101 reads the remaining amount of ink from the IC chip 121C of the non-dedicated ink cartridge 121B for each of CMYK, and transmits non-dedicated remaining amount data indicating the read remaining amount of ink to the management server 2.

The permission unit 102 permits the multifunction machine 1 to perform printing using the dedicated ink cartridge 121A when a predetermined condition is satisfied in a case where the user P withdraws from the service. Details of the permission unit 102 will be described later.

The print controller 103 controls printing by the printing unit 12. When the non-dedicated ink cartridge 121B is installed in the multifunction machine 1, the print controller 103 causes the printing unit 12 to perform printing regardless of the permission unit 102. The print controller 103 causes the printing unit 12 to perform printing regardless of the control by the permission unit 102 when the user P has subscribed to the service and the dedicated ink cartridge 121A is installed in the multifunction machine 1. When the user P withdraws from the service and the dedicated ink cartridge 121A is installed in the multifunction machine 1, the print controller 103 controls printing to be available within the amount of ink permitted by the permission unit 102.

In addition, when the ink cartridge 121 is installed in the multifunction machine 1, the print controller 103 updates the remaining amount of ink recorded on the IC chip 121C of the ink cartridge 121 each time the printing unit 12 performs printing.

1-3. Configuration of Terminal Device

Figure 3:
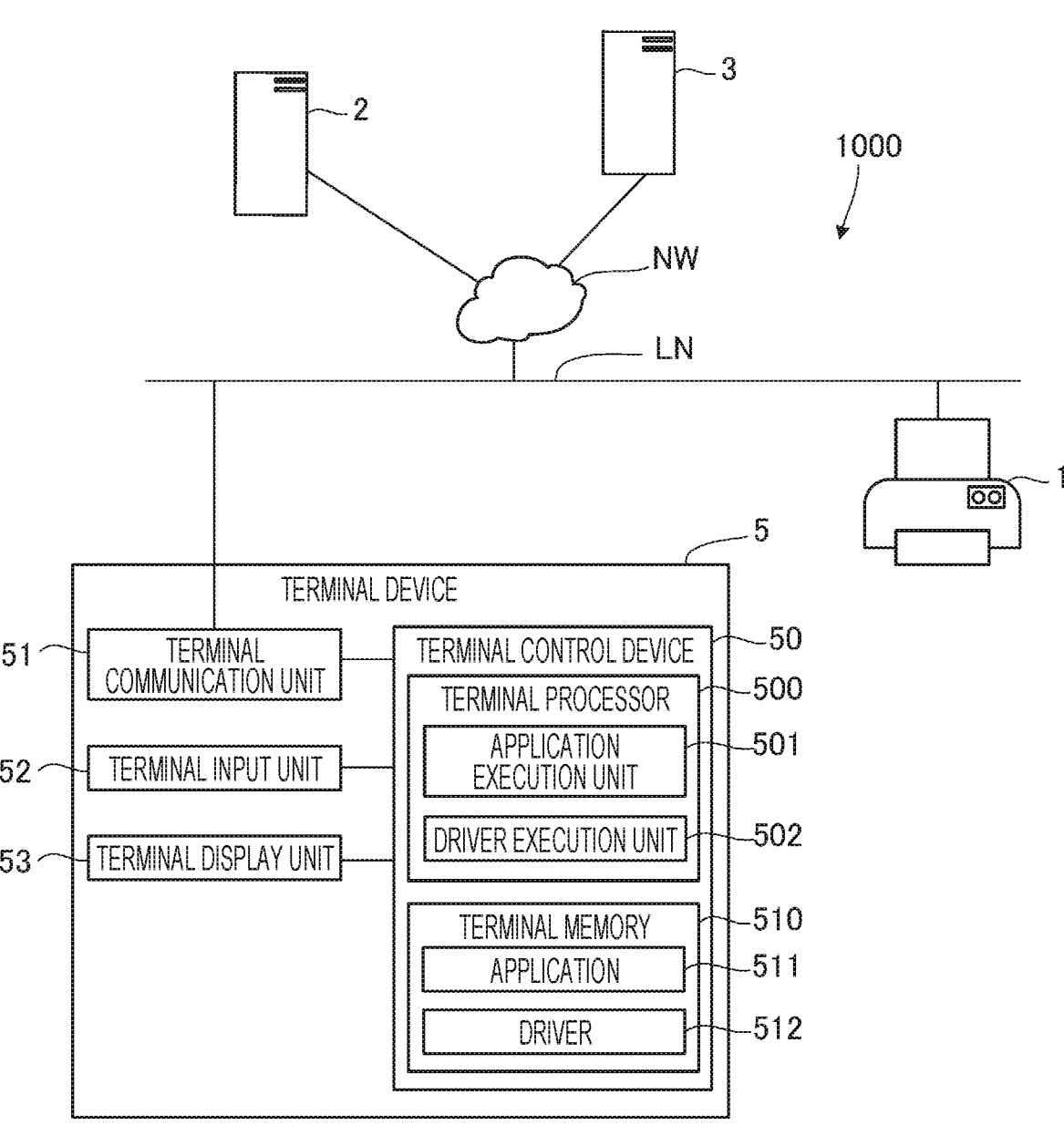
FIG. 3 is a diagram showing the configuration of a terminal device.

Next, the configuration of the terminal device 5 will be described. FIG. 3 is a block diagram showing the configuration of the terminal device 5.

The terminal device 5 includes a terminal control device 50, a terminal communication unit 51, a terminal input unit 52, and a terminal display unit 53.

The terminal control device 50 includes a terminal processor 500 including a CPU, an MPU, and the like, and a terminal memory 510, and controls the respective units of the terminal device 5. The terminal memory 510 stores a program executed by the terminal processor 500 and data processed by the terminal processor 500. The terminal memory 510 stores an application 511 executed by the terminal processor 500, a driver 512, and various other pieces of data. The terminal memory 510 includes a non-volatile storage area. The terminal memory 510 may include a volatile storage area and constitute a work area for terminal processor 500. The terminal memory 510 is composed of, for example, a ROM, a RAM, and the like.

The application 511 is an application program related to a service. The application 511 may be a dedicated application program related to a service, or may be a browser. The driver 512 is a program that causes the multifunction machine 1 to print an image.

The terminal communication unit 51 includes communication hardware such as a communication circuit that conforms to a predetermined communication standard, and communicates with the multifunction machine 1 connected to the local network LN and the management server 2 under the control of the terminal control device 50.

The terminal input unit 52 includes a keyboard, a mouse, and other input means, detects the operation of the user P on the input means, and outputs the detected operation to the terminal control device 50. The terminal control device 50 executes a process corresponding to the user P's operation on the input means based on the input from the terminal input unit 52.

The terminal display unit 53 includes a display, and displays various information on the display under the control of the terminal control device 50.

The terminal processor 500 functions as an application execution unit 501 by reading and executing the application 511. Furthermore, the terminal processor 500 functions as a driver execution unit 502 by reading and executing the driver 512.

The application execution unit 501 executes a process related to a subscription to a service and a process related to a withdrawal from a service.

The application execution unit 501 displays a user interface on the terminal display unit 53 for the user to subscribe to the service. The serial number 113, delivery destination information indicating the delivery destination KO of the dedicated ink cartridge 121A, and the like are input to the user interface. Note that the delivery destination information is, for example, information about the address of the delivery destination KO. The application execution unit 501 transmits request-for-subscription information including the information input into the user interface to the management server 2 via the terminal communication unit 51.

The application execution unit 501 displays a user interface on the terminal display unit 53 for the user P who subscribed to the service to withdraw from the service. A member identification (ID) for identifying a membership of the service and the like are input to the user interface. The application execution unit 501 transmits request-for-withdrawal information including information input to the user interface to the management server 2 via the terminal communication unit 51.

The driver execution unit 502 generates print data to transmit the generated print data to the multifunction machine 1 via the terminal communication unit 51. The print data includes image data of an image to be printed, print commands based on the command system of the multifunction machine 1, and the like.

1-4. Configuration of Management Server

Figure 4:
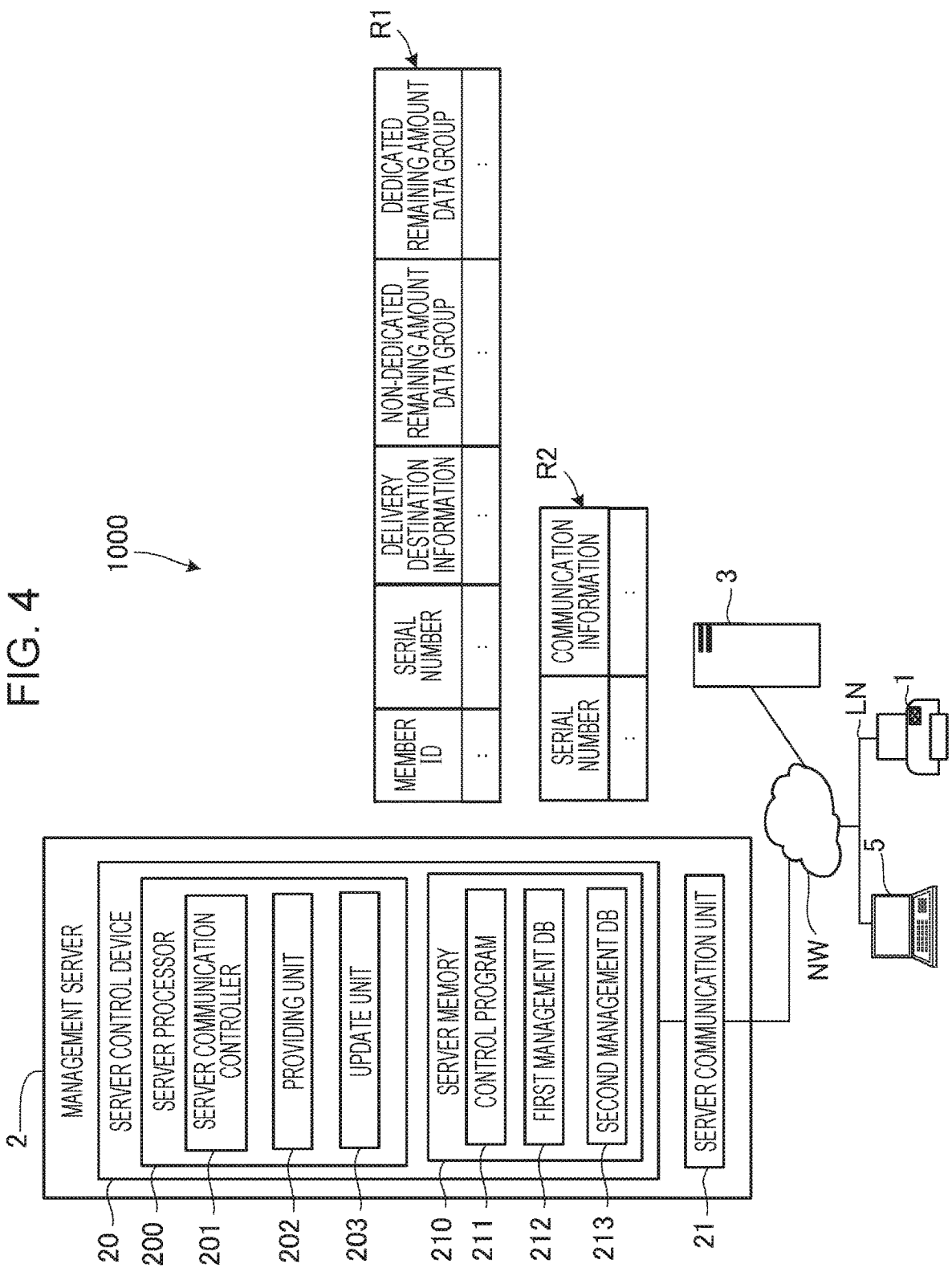
FIG. 4 is a diagram showing the configuration of a management server.

Next, the configuration of the management server 2 will be described. FIG. 4 is a block diagram showing the configuration of the management server 2.

The management server 2 has a server control device 20. The server control device 20 includes a server processor 200 configured by one or a plurality of CPUs, MPUs, and the like, and a server memory 210, and controls the respective units of the management server 2. Server memory 210 corresponds to an example of a "storage unit".

Server memory 210 stores a program executed by the server processor 200 and data processed by the server processor 200. The server memory 210 stores a control program 211 executed by the server processor 200, a first management DB 212, a second management DB 213, and various other pieces of data. Server memory 210 includes a non-volatile storage area. Server memory 210 may include a volatile storage area and constitute a work area for the server processor 200. The server memory 210 is composed of, for example, a ROM, a RAM, and the like.

The first management DB 212 is a database that manages data related to a service. The first management DB 212 has a record R1 for each member subscribed to the service. One record R1 includes a member ID, the serial number 113, delivery destination information, a non-dedicated remaining amount data group, and a dedicated remaining amount data group.

The second management DB 213 is a database that manages data related to the multifunction machine 1. The second management DB 213 has a record R2 for each multifunction machine 1. The record R2 includes the serial number 113 and communication information for communicating with the multifunction machine 1. An example of the communication information includes a predetermined address.

The management server 2 includes a server communication unit 21. The server communication unit 21 includes communication hardware that conforms to a predetermined communication standard, and communicates with the terminal device 5 and the multifunction machine 1 under the control of the server control device 20.

The server processor 200 functions as a server communication controller 201, a providing unit 202, and an update unit 203.

The server communication controller 201 communicates with the terminal device 5 and the multifunction machine 1 via the server communication unit 21.

The providing unit 202 provides the dedicated ink cartridge 121A to the user P who has subscribed to the service. The providing unit 202 provides the dedicated ink cartridge 121A to the user P who has subscribed to the service by transmitting, to the delivery server 3, a delivery request for delivering the dedicated ink cartridge 121A. The providing unit 202 transmits delivery request information to the delivery server 3 in the delivery request. The delivery request information includes delivery destination information.

The update unit 203 updates the first management DB 212. The update unit 203 performs an update related to a subscription to the service and an update related to a withdrawal from the service.

The update unit 203 generates the record R1 and stores the generated record R1 in the first management DB 212 as an update related to a subscription to the service. The update unit 203 generates the member ID when the server communication controller 201 receives the request-for-subscription information from the terminal device 5. Next, the update unit 203 generates the record R1 including the generated member ID, the serial number 113 included in the received request-for-subscription information, the delivery destination information included in the received request-for-subscription information, a non-dedicated remaining amount data group indicating a blank, and a dedicated remaining amount data group indicating a blank. Next, the update unit 203 stores the generated record R1 in the first management DB 212.

Note that when the update unit 203 stores a new record R1 in the first management DB 212, the server communication controller 201 transmits the member ID included in the newly stored record R1 to the terminal device 5 as a response to the request-for-subscription information. Further, when the update unit 203 newly stores the record R1 in the first management DB 212, the providing unit 202 makes a request of the delivery server 3 for deliver. Specifically, the providing unit 202 transmits to the delivery server 3 delivery request information including the delivery destination information about the newly stored record R1.

The update unit 203 deletes the record R1 as an update related to a withdrawal from the service. When the server communication controller 201 receives the request-for-withdrawal information from the terminal device 5, the update unit 203 identifies the record R1 having the member ID included in the received request-for-withdrawal information from the first management DB 212. Next, the update unit 203 deletes the identified record R1 from the first management DB 212.

The update unit 203 updates the information included in the record R1. When the server communication controller 201 receives the non-dedicated remaining amount data group from the multifunction machine 1, the update unit 203 updates the non-dedicated remaining amount data group included in the record R1 to the received non-dedicated remaining amount data group. As described above, the serial number 113 is attached to the non-dedicated remaining amount data group transmitted from the multifunction machine 1. The update unit 203 identifies the record R1 having the serial number 113, and updates the non-dedicated remaining amount data group of the identified record R1 to the received non-dedicated remaining amount data group.

When the server communication controller 201 receives the dedicated remaining amount data group from the multifunction machine 1, the update unit 203 updates the dedicated remaining amount data group included in the record R1 to the received dedicated remaining amount data group. As described above, the serial number 113 is attached to the dedicated remaining amount data group transmitted from the multifunction machine 1. The update unit 203 identifies the record R1 having the serial number 113, and updates the dedicated remaining amount data group of the identified record R1 to the received dedicated remaining amount data group.

1-5. Operation of Each Unit of Service Providing System

Next, the operation of each unit of the service providing system 1000 will be described. First, the operation of each unit of the service providing system 1000 when the user P subscribes to the service will be described.

Figure 5:
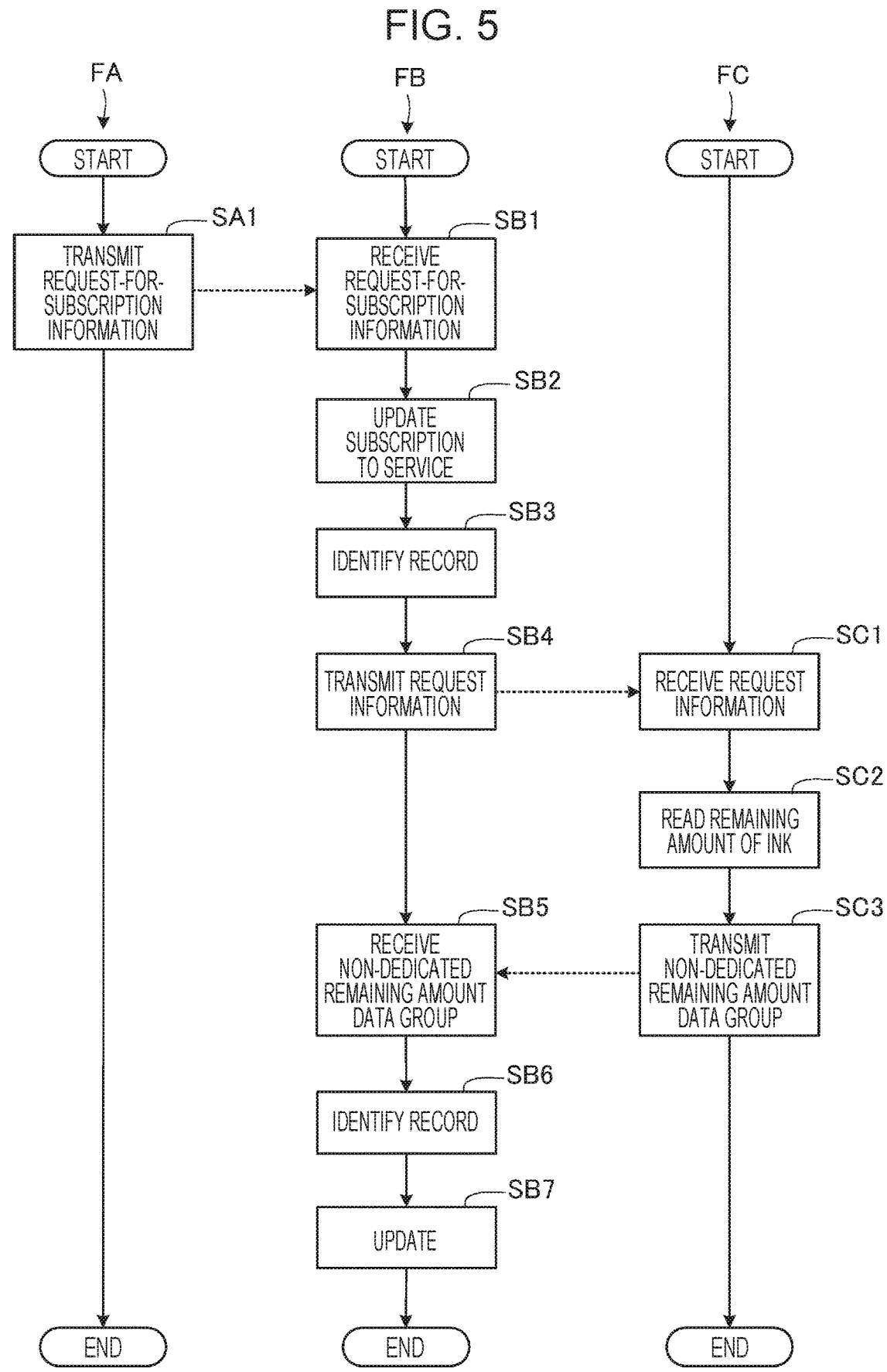
FIG. 5 is a flowchart showing operations of the terminal device, the management server, and the multifunction machine.

FIG. 5 is a flowchart showing the operations of the terminal device 5, the management server 2, and the multifunction machine 1. In FIG. 5, a flowchart FA shows the operation of the terminal device 5, a flowchart FB shows the operation of the management server 2, and a flowchart FC shows the operation of the multifunction machine 1.

As shown in the flowchart FA, the application execution unit 501 transmits request-for-subscription information to the management server 2 (step SA1).

As shown in the flowchart FB, the server communication controller 201 receives the request-for-subscription information from the management server 2 (step SB1).

Next, the update unit 203 updates the subscription to the service based on the request-for-subscription information received in step SB1 (step SB2).

Next, the server communication controller 201 identifies the record R2 having the serial number 113 included in the request-for-subscription information received in step SB1 from the second management DB 213 (step SB3).

Next, the server communication controller 201 uses the communication information about the record R2 identified in step SB3 to transmit the request information to the multifunction machine 1 (step SB4). The request information is information for requesting a non-dedicated remaining amount data group.

As shown in flowchart FC, multifunction machine communication controller 101 receives the request information from the management server 2 (step SC1).

Next, by communicating with the IC chip 121C, the multifunction machine communication controller 101 reads the remaining amount of ink from each of the non-dedicated ink cartridges 121B installed in the multifunction machine 1 (step SC2).

Next, the multifunction machine communication controller 101 transmits the non-dedicated remaining amount data group to the management server 2 as a response to the request information (step SC3). The non-dedicated remaining amount data included in the non-dedicated remaining amount data group transmitted in step SC3 indicates the remaining amount of ink read in step SC2. Further, the serial number 113 stored in the multifunction machine memory 110 is added to the non-dedicated remaining amount data group transmitted in step SC3.

As shown in the flowchart FB, the server communication controller 201 receives the non-dedicated remaining amount data group from the multifunction machine 1 (step SB5).

Next, the update unit 203 identifies, from the first management DB 212, the record R1 having the serial number 113 added to the non-dedicated remaining amount data group received in step SB5 (step SB6).

Next, the update unit 203 updates the non-dedicated remaining amount data group of the record R1 identified in step SB6 to the non-dedicated remaining amount data group received in step SB5 (step SB7).

By performing the operation shown in FIG. 5, the management server 2 can store the amount of ink remaining in the non-dedicated ink cartridge 121B installed when the user P subscribes to the service.

Next, the operation of each unit of the service providing system 1000 when the user P withdraws from the service will be described.

Figure 6:
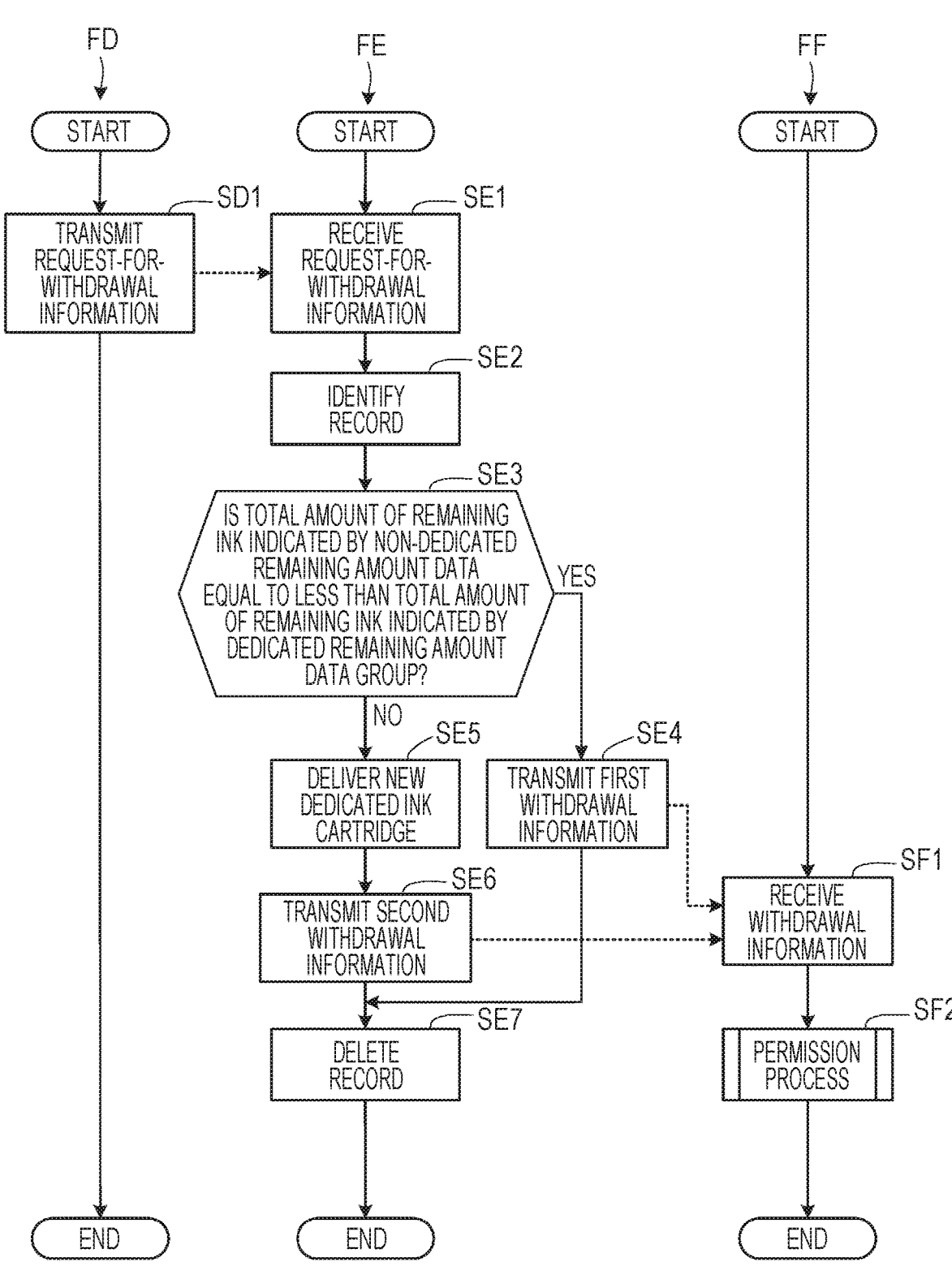
FIG. 6 is a flowchart showing operations of the terminal device, the management server, and the multifunction machine.

FIG. 6 is a flowchart showing operations of the terminal device 5, the management server 2, and the multifunction machine 1. In FIG. 6, a flowchart FD shows the operation of the terminal device 5, a flowchart FE shows the operation of the management server 2, and a flowchart FF shows the operation of the multifunction machine 1.

As shown in the flowchart FD, the application execution unit 501 transmits request-for-withdrawal information to the management server 2 (step SD1).

As shown in the flowchart FE, the server communication controller 201 receives the request-for-withdrawal information from the terminal device 5 (step SE1).

Next, the server communication controller 201 identifies the record R1 having the serial number 113 included in the request-for-withdrawal information received in step SE1 from the first management DB 212 (step SE2).

Next, the providing unit 202 determines whether the total amount of remaining ink indicated by the non-dedicated remaining amount data group of the record R1 identified in step SE2 is equal to or less than the total amount of remaining ink indicated by the group of dedicated remaining amount data of the record R1 (step SE3).

When the providing unit 202 determines that the total amount of remaining ink indicated by the non-dedicated remaining amount data group is equal to or less than the total amount of remaining ink indicated by the dedicated remaining amount data group (step SE3: YES), the server communication controller 201 transmits first withdrawal information to the multifunction machine 1 (step SE4).

The first withdrawal information is information indicating that the user P has withdrawn from the service, and includes the non-dedicated remaining amount data group of the record R1 identified in step SE2. Note that the first withdrawal information may include the dedicated remaining amount data group of the record R1 identified in step SE2.

In step SE4, the server communication controller 201 identifies, from the second management DB 213, the record R2 of the serial number 113 included in the request-for-withdrawal information received in step SE1. Then, the server communication controller 201 generates first withdrawal information to transmit the generated first withdrawal information to the multifunction machine 1 using the communication information about the record R2 identified from the second management DB 213.

Returning to the description of step SE3, when it is determined that the total amount of remaining ink indicated by the non-dedicated remaining amount data group is more than the total amount of remaining ink indicated by the dedicated remaining amount data group (step SE3: NO), the providing unit 202 delivers the new dedicated ink cartridge 121A to the user P (step SE5).

In step SE5, the providing unit 202 transmits the delivery request information to the delivery server 3. The delivery request information transmitted in step SE5 includes delivery destination information included in the record R1 identified in step SE2, information indicating delivery of the new dedicated ink cartridges 121A for all CMYK colors, and the like. When the delivery server 3 receives the delivery request information, the delivery server 3 instructs the delivery person to deliver the dedicated ink cartridges 121A for all colors to the delivery destination KO indicated by the delivery destination information in the received delivery request information.

When the providing unit 202 provides the new dedicated ink cartridge 121A, the server communication controller 201 transmits second withdrawal information to the multifunction machine 1 (step SE6).

The second withdrawal information is information indicating that the user P has withdrawn from the service, and includes the non-dedicated remaining amount data group of the record R1 identified in step SE2. Further, the second withdrawal information includes information indicating that the new dedicated ink cartridge 121A has been provided to the user P. Note that, as in the first withdrawal information, the second withdrawal information may include the dedicated remaining amount data group of the record R1 identified in step SE2.

As shown in the flowchart FF, the multifunction machine communication controller 101 receives either the first withdrawal information or the second withdrawal information (step SF1).

Next, the permission unit 102 performs a permission process based on the withdrawal information received in step SF1 (step SF2). The permission process is a process related to permission for printing using the dedicated ink cartridge 121A.

Figure 7:
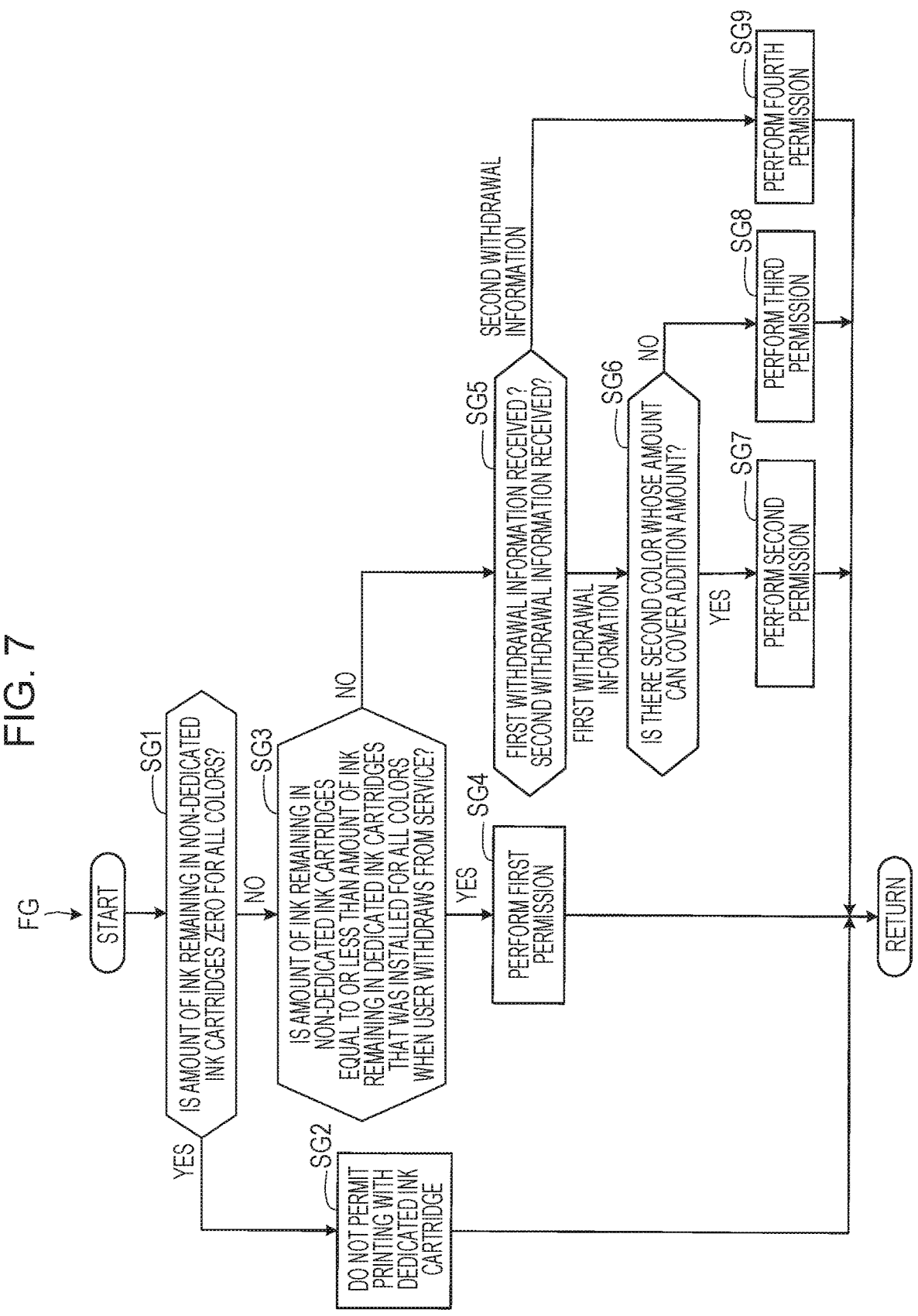
FIG. 7 is a flowchart showing the operation of a permission unit in a permission process.

FIG. 7 is a flowchart FG showing the operation of the permission unit 102 in the permission process. The permission unit 102 determines whether the amount of ink remaining in the non-dedicated ink cartridges 121B when the user P subscribes the service is zero for all colors (step SG1).

In step SG1, the permission unit 102 determines whether each of the non-dedicated remaining amount data included in the withdrawal information received in step SF1 indicates that the remaining amount of ink is zero. When all the non-dedicated remaining amount data indicates zero, the permission unit 102 makes an affirmative determination in step SG1. On the other hand, when there is non-dedicated remaining amount data that does not indicate zero among the plurality of pieces of non-dedicated remaining amount data, the permission unit 102 makes a negative determination in step SG1.

When it is determined that the amount of ink remaining in the non-dedicated ink cartridges 121B is zero for all colors (step SG1: YES), the permission unit 102 does not permit printing using the dedicated ink cartridge 121A (step SG2).

In step SG2, the permission unit 102 sets a setting value indicating non-permission for a permission/non-permission item in the setting data 112. The permission/non-permission item is an item for setting whether to permit printing using the dedicated ink cartridge 121A. When the dedicated ink cartridge 121A is installed, the print controller 103 does not perform printing when a setting value of non-permission is set for the permission/non-permission item.

When it is determined that the amount of ink remaining in the non-dedicated ink cartridges 121B for all colors is not zero, that is, there is a remaining amount of ink in any of the non-dedicated ink cartridges 121B (step SG1: NO), the permission unit 102 performs a process of step SG3. Here, the permission unit 102 determines whether the amount of ink remaining in the non-dedicated ink cartridges 121B when the user P subscribes to the service is equal to or less than the amount of ink remaining in the dedicated ink cartridges 121A installed when the user P withdraws from the service for all colors (step SG3).

In step SG3, the permission unit 102 reads the remaining amount of ink for all colors from the IC chip 121C of the dedicated ink cartridge 121A. Next, the permission unit 102 compares the remaining amount of ink indicated by the non-dedicated remaining amount data of the withdrawal information received in step SE1 with the read remaining amount of ink for each color. When the remaining amount of ink indicated by the non-dedicated remaining amount data is equal to or less than the read remaining amount of ink for all colors, the permission unit 102 makes an affirmative determination in step SG3. On the other hand, when the remaining ink amount indicated by the non-dedicated remaining amount data is greater than the read remaining amount of ink for at least one of the colors, the permission unit 102 makes a negative determination in step SG3.

When making the affirmative determination in step SG3, the permission unit 102 performs a first permission (step SG4).

The first permission indicates that printing using the dedicated ink cartridge 121A is permitted even after the user withdraws from the service. Further, for each of CMYK, the first permission indicates permission to use ink in the dedicated ink cartridge 121A for printing by the amount of ink remaining in a non-dedicated ink cartridge ICB at the time of subscribing to the service.

Specifically, in step SG4, permission unit 102 sets a setting value indicating permission for the permission/non-permission item in the setting data 112. Further, the permission unit 102 records the amount of ink in the dedicated ink cartridge 121A that is permitted to use for each of CMYK in the multifunction machine memory 110. Note that when the permission unit 102 permits printing, the print controller 103 subtracts the amount of ink consumed by printing from the amount of ink recorded in the multifunction machine memory 110 by the permission unit 102 each time printing is executed.

Example 1

Example 1 shows an example of the first permission.

In Example 1, for each of CMYK, it is assumed that the amount of ink remaining in the non-dedicated ink cartridge 121B at the time of subscribing to the service is 5 g (grams). In Example 1, for each of CMYK, it is assumed that the amount of ink remaining in the dedicated ink cartridge 121A installed when the user withdraws from the service is 10 g. In this example, for each of CMYK, the permission unit 102 permits to use 5 g of ink in the dedicated ink cartridge 121A for printing as the first permission.

In Example 1, the permission unit 102 sets the setting data 112 to a setting value indicating permission for the permission/non-permission item, and records the information in the multifunction machine memory 110 that the amount of ink in the dedicated ink cartridge 121A that is permitted to use for each of CMYK is 5 g.

Returning to the description of step SG3, when the permission unit 102 makes a negative determination in step SG3, the permission unit 102 determines whether the withdrawal information received in step SF1 is the first withdrawal information or the second withdrawal information (step SG5).

When it is determined that the withdrawal information received in step SF1 is the first withdrawal information (step SG5: first withdrawal information), the permission unit 102 determines whether there is a second color whose amount can cover an addition amount (step SG6).

Here, the addition amount will be described. Prior to describing the addition amount, a first color, a second color, a first remaining amount, and a second remaining amount will be described. The first color is a color in which the remaining amount of ink indicated by the non-dedicated remaining amount data is greater than the amount of ink remaining in the dedicated ink cartridge 121A when the user P withdraws from the service. The second color is a color in which the remaining amount of ink indicated by the non-dedicated remaining amount data is less than the amount of ink remaining in the dedicated ink cartridge 121A when the user P withdraws from the service. The first remaining amount is a remaining amount of ink indicated by the non-dedicated remaining amount data corresponding to the first color when the user subscribes to the service. The second remaining amount is an amount of ink remaining in the dedicated ink cartridge 121A corresponding to the first color when the user withdraws from the service. The addition amount is an amount obtained by adding a difference between the first remaining amount and the second remaining amount to an amount of ink remaining in the non-dedicated ink cartridge 121B corresponding to the second color when the user subscribes to the service.

Example 2

Example 2 shows an example of the addition amount, the first remaining amount, the second remaining amount, the first color, and the second color.

In Example 2, it is assumed that when the user subscribes to the service, the amount of ink remaining in the non-dedicated ink cartridge 121B for C (cyan) is 5 g, the amount of ink remaining in the non-dedicated ink cartridge 121B for M (magenta) is 5 g, the amount of ink remaining in the non-dedicated ink cartridge 121B for Y (yellow) is 5 g, and the amount of ink remaining in the non-dedicated ink cartridge 121B for K (black) is 10 g. In this example, when withdrawing from the service, the amount of ink remaining in the dedicated ink cartridge 121A for C (cyan) is 6 g, the amount of ink remaining in the dedicated ink cartridge 121A for M (magenta) is 5 g, the amount of ink remaining in the dedicated ink cartridge 121A for Y (yellow) is 5 g, and the amount of ink remaining in the dedicated ink cartridge 121A for K (black) is 9 g.

In Example 2, the first color is K (black) and the second color is C (cyan). Further, in Example 2, the first remaining amount is 10 g, and the second remaining amount is 9 g. Further, in Example 2, the addition amount is 6 g (=5 g+(10 g−9 g)).

Note that in the case of Example 2, C (cyan) is the second color whose amount can cover the addition amount, so that the permission unit 102 makes an affirmative determination in step SG6.

When it is determined that there is a second color whose amount can cover the addition amount (step SG6: YES), the permission unit 102 performs second permission (step SG7).

The second permission indicates that printing using the dedicated ink cartridge 121A is permitted even after the user withdraws from the service. In addition, for the first color, the second permission indicates permission to use ink in the dedicated ink cartridge 121A for printing by the amount of ink remaining in the dedicated ink cartridge 121A installed at the time of withdrawal from the service. Further, for one second color among the second colors whose amount can cover the addition amount, the second permission indicates permission to use ink in the dedicated ink cartridge 121A for printing by the addition amount. Further, for other colors, the second permission indicates permission to use ink in the dedicated ink cartridge 121A for printing by the amount of ink remaining in the dedicated ink cartridge 121A installed at the time of withdrawal from the service. Here, the other colors are colors other than the first color and the second color permitted to use by the addition amount.

Specifically, the permission unit 102 sets a setting value indicating permission for the permission/non-permission item in the setting data 112 in step SG7. Furthermore, the permission unit 102 records in the multifunction machine memory 110 the amount of ink in the dedicated ink cartridge 121A permitted to use for each of CMYK.

Example 3

Example 3 shows an example of the second permission.

In Example 3, it is assumed that when the user subscribes to the service, the amount of ink remaining in the non-dedicated ink cartridge 121B for C (cyan) is 5 g, the amount of ink remaining in the non-dedicated ink cartridge 121B for M (magenta) is 5 g, the amount of ink remaining in the non-dedicated ink cartridge 121B for Y (yellow) is 5 g, and the amount of ink remaining in the non-dedicated ink cartridge 121B for K (black) is 10 g. In Example 3, it is assumed that when the user withdraws from the service, the amount of ink remaining in the dedicated ink cartridge 121A for C (cyan) is 6 g, the amount of ink remaining in the dedicated ink cartridge 121A for M (magenta) is 5 g, the amount of ink remaining in the dedicated ink cartridge 121A for Y (yellow) is 5 g, and the amount of ink remaining in the dedicated ink cartridge 121A for K (black) is 9 g. Further, in Example 3, K is the first color, and C (cyan) is the second color whose amount can cover the addition amount.

In example 3, for K (black), the permission unit 102 permits to use 9 g of ink in the dedicated ink cartridge 121A for printing as the second permission. Further, in Example 3, for C (cyan), the permission unit 102 permits to use 6 g (=5 g+(10 g−9 g)) of ink in the dedicated ink cartridge 121A for printing as the second permission. Further, in Example 3, for each of M (magenta) and Y (yellow), the permission unit 102 permits to use 5 g of ink in the dedicated ink cartridge 121A for printing as the second permission.

Note that when performing the second permission, in a case where there is a plurality of second colors whose amount can cover the addition amount, the permission unit 102 determines that the second color with the largest cumulative usage amount in the multifunction machine 1 is a second color that is permitted to use by the addition amount. The permission unit 102 acquires the cumulative usage amount of ink for all colors from a predetermined storage area, and determines that the second color with the largest acquired cumulative usage amount is a second color that is permitted to use by the addition amount. Note that the cumulative usage amount may be stored in the multifunction machine 1 or may be stored in a predetermined server device connected to the communication network NW.

Example 4

Example 4 shows an example of the second permission.

In Example 4, it is assumed that when the user subscribes to the service, the amount of ink remaining in the non-dedicated ink cartridge 121B for C (cyan) is 5 g, the amount of ink remaining in the non-dedicated ink cartridge 121B for M (magenta) is 5 g, the amount of ink remaining in the non-dedicated ink cartridge 121B for Y (yellow) is 5 g, and the amount of ink remaining in the non-dedicated ink cartridge 121B for K (black) is 10 g. In Example 4, it is assumed that when the user withdraws from the service, the amount of ink remaining in the dedicated ink cartridge 121A for C (cyan) is 6 g, the amount of ink remaining in the dedicated ink cartridge 121A for M (magenta) is 6 g, the amount of ink remaining in the dedicated ink cartridge 121A for Y (yellow) is 5 g, and the amount of ink remaining in the dedicated ink cartridge 121A for K (black) is 9 g. Further, in Example 4, K is the first color, and C (cyan) and M (magenta) are the second colors whose amount can cover the addition amount.

In Example 4, when the cumulative usage amount of C (cyan) is larger than that of M (magenta), the permission unit 102 performs the second permission similar to Example 3.

On the other hand, in Example 4, when the cumulative usage amount of M (magenta) is larger than that of C (cyan), the permission unit 102 permits to use 9 g of ink in the dedicated ink cartridge 121A for printing for K (black) as the second permission. Furthermore, in this case, for M (magenta), the permission unit 102 permits to use 6 g (=5 g+(10 g−9 g)) of ink in the dedicated ink cartridge 121A for printing as the second permission. Further, in Example 3, for each of C (cyan) and Y (yellow), the permission unit 102 permits to use 5 g of ink in the dedicated ink cartridge 121A for printing as the second permission. Note that although an example in which the amount of ink is controlled in grams is described above, the unit of the amount of ink to be controlled is not limited to this.

Returning to the description of step SG6, when it is determined that there is no second color whose amount can cover the addition amount (step SG6: NO), the permission unit 102 performs third permission (step SG8).

The third permission indicates that printing using the dedicated ink cartridge 121A is permitted even after withdrawal from the service. Further, for the first color, the third permission indicates permission to use ink in the dedicated ink cartridge 121A for printing by the amount of ink remaining in the dedicated ink cartridge 121A installed at the time of withdrawal from the service. In addition, for a plurality of second colors among the second colors, the third permission indicates permission to use ink in the dedicated ink cartridge 121A for printing by the amount of ink obtained by considering a difference between the first remaining amount and the second remaining amount. In addition, for ink in other colors, the third permission indicates permission to use ink in the dedicated ink cartridge 121A for printing by the amount of ink remaining in the dedicated ink cartridge 121A installed at the time of withdrawal from the service. Here, the other colors are colors other than the first color and the second color obtained by considering a difference between the first remaining amount and the second remaining amount is considered.

Specifically, the permission unit 102 sets a setting value indicating permission for the permission/non-permission item in the setting data 112 in step SG8. Furthermore, the permission unit 102 records in the multifunction machine memory 110 the amount of ink in the dedicated ink cartridge 121A permitted to use for each of CMYK.

Example 5

Example 5 shows an example of the third permission.

In example 5, it is assumed that when the user subscribes to the service, the amount of ink remaining in the non-dedicated ink cartridge 121B for C (cyan) is 5 g, the amount of ink remaining in the non-dedicated ink cartridge 121B for M (magenta) is 5 g, the amount of ink remaining in the non-dedicated ink cartridge 121B for Y (yellow) is 5 g, and the amount of ink remaining in the non-dedicated ink cartridge 121B for K (black) is 10 g. In Example 3, it is assumed that when the user withdraws from the service, the amount of ink remaining in the dedicated ink cartridge 121A for C (cyan) is 6 g, the amount of ink remaining in the dedicated ink cartridge 121A for M (magenta) is 6 g, and the amount of ink remaining in the dedicated ink cartridge 121A for Y (yellow) is 6 g, and the amount of ink remaining in the dedicated ink cartridge 121A for K (black) is 8 g. Further, in Example 5, K is the first color, and each of CMY is the second color whose amount cannot cover the addition amount.

In Example 5, for K (black), the permission unit 102 permits to use 8 g of ink in the dedicated ink cartridge 121A for printing as the third permission. Further, in Example 5, for two colors of CMY, the permission unit 102 permits to use 6 g (=(5 g+1 g)) of ink in the dedicated ink cartridge 121A for printing as the second permission. In Example 5, for one color of CMY, the permission unit 102 permits to use 5 g of ink in the dedicated ink cartridge 121A for printing as the second permission.

Returning to the description of step SG5, when it is determined that the withdrawal information received in step SF1 is the second withdrawal information (step SG5: second withdrawal information), the permission unit 102 performs fourth permission (step SG9).

The fourth permission indicates that printing using the dedicated ink cartridge 121A is permitted even after the user withdraws from the service. For the first color, the fourth permission indicates permission to use ink in the dedicated ink cartridge 121A for printing by the amount of ink remaining in the dedicated ink cartridge 121A installed at the time of withdrawal from the service. Further, for the first color, the fourth permission permits to use ink in the newly provided dedicated ink cartridge 121A for printing by a difference between the first remaining amount and the second remaining amount. For colors other than the first color, the fourth permission indicates permission to use ink in the dedicated ink cartridge 121A for printing by the amount of ink remaining in the dedicated ink cartridge 121A installed at the time of withdrawal from the service.

Specifically, the permission unit 102 sets a setting value indicating permission for the permission/non-permission item in the setting data 112 in step SG9. Furthermore, the permission unit 102 records in the multifunction machine memory 110 the amount of ink in the dedicated ink cartridge 121A permitted to use for each of CMYK.

Example 6

Example 6 shows an example of the fourth permission.

In Example 6, it is assumed that when the user subscribes to the service, the amount of ink remaining in the non-dedicated ink cartridge 121B for C (cyan) is 5 g, the amount of ink remaining in the non-dedicated ink cartridge 121B for M (magenta) is 5 g, the amount of ink remaining in the non-dedicated ink cartridge 121B for Y (yellow) is 5 g, and the amount of ink remaining in the non-dedicated ink cartridge 121B for K (black) is 10 g. In Example 6, it is assumed that when the user withdraws from the service, the amount of ink remaining in the dedicated ink cartridge 121A for C (cyan) is 5 g, the amount of ink remaining in the dedicated ink cartridge 121A for M (magenta) is 5 g, the amount of ink remaining in the dedicated ink cartridge 121A for Y (yellow) is 5 g, and the amount of ink remaining in the dedicated ink cartridge 121A for K (black) is 9 g. In Example 6, K (black) is the first color.

In example 6, for K (black), the permission unit 102 permits to use 9 g of ink in the dedicated ink cartridge 121A for printing as the fourth permission. In example 6, for K (black), the permission unit 102 permits to use 1 g of ink in the dedicated ink cartridge 121A to be newly delivered for printing as the fourth permission. In example 6, for each of CMY, the permission unit 102 permits to use 5 g of ink in the dedicated ink cartridge 121A for printing as the fourth permission.

Figure 8:
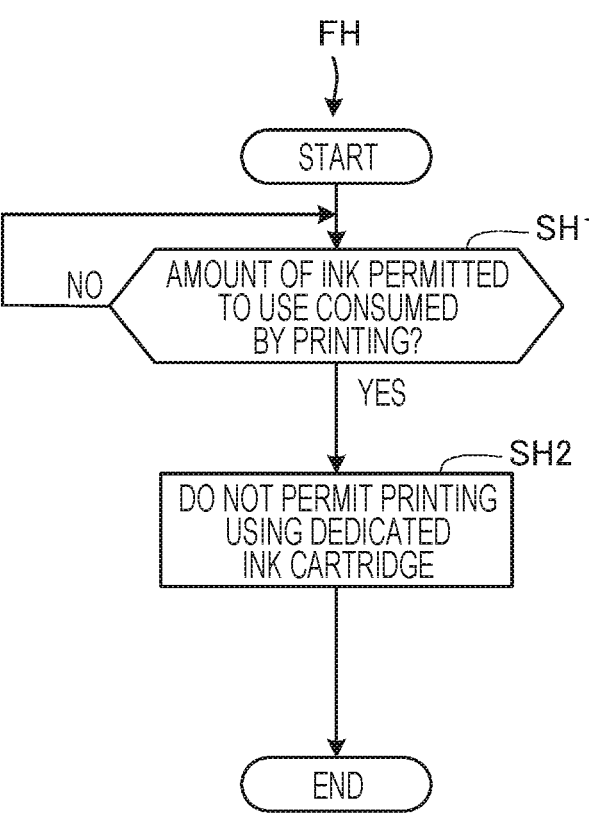
FIG. 8 is a flowchart showing the operation of the multifunction machine.

Next, the operation of the multifunction machine 1 after the permission process will be described. FIG. 8 is a flowchart FH showing the operation of the multifunction machine 1.

For each of CMYK, the permission unit 102 determines whether the amount of ink in the dedicated ink cartridge 121A permitted to use has been consumed in printing (step SH1). When the amount of ink recorded in the multifunction machine memory 110 is zero for any of CMYK, the permission unit 102 makes an affirmative determination in step SH1.

When it is determined that the amount of ink in the dedicated ink cartridge 121A has been consumed for printing (step SH1: YES), the permission unit 102 does not permit printing using the dedicated ink cartridge 121A (step SH2).

1-6. Effects of Present Embodiment

As described above, the service providing system 1000 provides a service of delivering the ink cartridge 121 containing ink used for the multifunction machine 1 to perform printing to the user P of the multifunction machine 1. The service providing system 1000 includes a providing unit 202 that delivers the dedicated ink cartridge 121A to be installed in place of the non-dedicated ink cartridge 121B installed in the multifunction machine 1 before the user subscribes to the service. The service providing system 1000 includes the server memory 210 that stores non-dedicated remaining amount data indicating the amount of ink remaining in the non-dedicated ink cartridge 121B. When the user withdraws from the service, the service providing system 1000 includes the permission unit 102 that permits the multifunction machine 1 to perform printing using the dedicated ink cartridge 121B according to the remaining amount of ink indicated by the non-dedicated remaining amount data stored in the server memory 210.

According to this, after the user withdraws from the service, printing by the multifunction machine 1 using the dedicated ink cartridge 121B is permitted according to the remaining amount of ink indicated by the non-dedicated remaining amount data stored in the server memory 210. Therefore, it is possible to perform printing by the amount of ink remaining in the ink cartridge 121 that was installed before the user subscribes to the service after the user withdraws from the service.

The ink cartridge 121 for each of a plurality of colors can be installed in the multifunction machine 1. The multifunction machine memory 110 stores non-dedicated remaining amount data of each of a plurality of colors. For the first color in which the remaining amount indicated by the non-dedicated remaining amount data is greater than the amount of ink remaining in the dedicated ink cartridge 121A when the user P withdraws from the service, the permission unit 102 permits to use the dedicated ink cartridge 121A for printing using the dedicated ink cartridge 121A by the amount of ink remaining in the dedicated ink cartridge 121A when the user P withdraws from the service. In addition, for the second color whose remaining amount indicated by the non-dedicated remaining amount data is less than the amount of ink remaining in the dedicated ink cartridge 121A when the user P withdraws from the service, the permission unit 102 permits to use the dedicated ink cartridge 121A by the addition amount for printing using the dedicated ink cartridge 121A. The addition amount is an amount obtained by adding a difference between the remaining amount indicated by the non-dedicated remaining amount data corresponding to the first color and the amount of ink remaining in the dedicated ink cartridge 121A corresponding to the first color when the user P withdraws from the service to the remaining amount indicated by the non-dedicated remaining amount data corresponding to the second color.

According to this, for the first color, when an amount of ink remaining in the ink cartridge 121 installed before the user subscribes to the service cannot be covered by a remaining amount of ink in the ink cartridge 121 installed at the time of withdrawal from the service, the amount by which the amount of ink remaining in the ink cartridge 121 installed before the user subscribes to the service cannot be covered by the amount of ink remaining in the ink cartridge 121 installed at the time of withdrawal from the service can be covered by the amount of ink in the dedicated ink cartridge 121A corresponding to the second color. Therefore, it is possible to appropriately perform printing for the amount of ink remaining in the ink cartridge 121 that was installed before the user subscribes to the service after the user withdraws from the service.

When there is a plurality of second colors, the permission unit 102 determines that the second color with the largest usage amount in the multifunction machine 1 is a second color that is permitted to use by the addition amount.

As a result, when an amount of ink remaining in the ink cartridge 121 installed before the user subscribes to the service cannot be covered by an amount of ink remaining in the ink cartridge 121 installed when the user withdraws from the service, the amount by which the remaining amount of ink in the ink cartridge 121 installed before the user subscribes to the service cannot be covered by the remaining amount of ink in the ink cartridge 121 installed when the user withdraws from the service can be covered by the amount of ink in the dedicated ink cartridge 121 of the color most used by the user P. Therefore, while taking into consideration the color most used by the user P, it is possible to perform printing for the amount of ink remaining in the ink cartridge 121 that was installed before the user subscribes to the service after the user withdraws from the service.

When the remaining amount of ink indicated by the non-dedicated remaining amount data is greater than the amount of ink remaining in the dedicated ink cartridge 121A when the user P withdrew from the service, the providing unit 202 delivers the new dedicated ink cartridge 121A. When the providing unit 202 provides the new dedicated ink cartridge 121A, the permission unit 102 permits the multifunction machine 1 to perform printing using the new dedicated ink cartridge 121A by the amount of ink corresponding to a difference between the remaining amount of ink indicated by the non-dedicated remaining amount data and the amount of ink remaining in the dedicated ink cartridge 121A when the user P withdraws from the service.

According to this, even when the amount of ink remaining in the ink cartridge 121 installed before the user subscribes to the service is greater than the amount of ink remaining in the ink cartridge 121 installed at the time of withdrawal from the service, it is possible to perform printing using the dedicated ink cartridge 121A by the amount of ink remaining in the non-dedicated ink cartridge 121B installed when the user subscribes to the service. Therefore, printing for the amount of ink remaining in the ink cartridge 121 that was installed before the user subscribes to the service can be reliably performed after the user withdraws from the service.

The method of controlling the service providing system 1000 includes delivering the dedicated ink cartridge 121A, storing the non-dedicated remaining amount data indicating the amount of ink remaining in the non-dedicated ink cartridge 121B, and permitting the multifunction machine 1 to perform printing using the dedicated ink cartridge 121A according to the remaining amount of ink indicated by the non-dedicated remaining amount data stored when the user P withdraws from the service.

According to this, the effects same as those of the service providing system 1000 described above can be obtained.

2. Second Embodiment

Next, the second embodiment will be described. The second embodiment differs from the first embodiment in the method of determining the second color that is permitted to use by the addition amount. The permission unit 102 of the second embodiment determines the second color that can most reduce the imbalance in the remaining amount of ink between the second colors is a second color that is permitted to use by the addition amount.

For example, it is assumed that when the user subscribes to the service, the amount of ink remaining in the non-dedicated ink cartridge 121B for C is 6 g, the amount of ink remaining in the non-dedicated ink cartridge 121B for M is 5 g, the amount of ink remaining in the non-dedicated ink cartridge 121B for Y is 6 g, and the amount of ink remaining in the non-dedicated ink cartridge 121B for K is 10 g. In this example, it is assumed that when the user withdraws from the service, the amount of ink remaining in the dedicated ink cartridge 121A for C is 6 g, the amount of ink remaining in the dedicated ink cartridge 121A for M is 7 g, the amount of ink remaining in the dedicated ink cartridge 121A for Y is 8 g, and the amount of ink remaining in the dedicated ink cartridge 121A for K is 9 g. In this example, K corresponds to the first color, and each of C, M, and Y corresponds to the second color. In this example, the first remaining amount is 10 g and the second remaining amount is 9 g. In this example, the color that is configured to most reduce the imbalance in the remaining amount of ink between C, M, and Y is M that has the least remaining amount of ink. Therefore, in this example, for M among the second colors C, M, and Y, the permission unit 102 permits to use 6 g of ink in the dedicated ink cartridge 121A for printing. As a result, 6 g, 6 g, 6 g, and 9 g of ink for C, M, Y, and K, respectively, are permitted to use when the user withdraws from the service, and the imbalance in the remaining amount of ink between CMY is reduced compared to when the user subscribes the service.

As described above, when there is a plurality of second colors, the permission unit 102 determines that the second color that is configured to most reduce the imbalance in the remaining amount between the second colors is a second color that is permitted to use by the addition amount.

According to this, when an amount of ink remaining in the ink cartridge 121 installed before the user subscribes to the service cannot be covered by an amount of ink remaining in the ink cartridge 121 installed at the time of withdrawal from the service, the amount by which the remaining amount of ink in the ink cartridge 121 installed before the user subscribes to the service cannot be covered by the remaining amount of ink in the ink cartridge 121 installed at the time of withdrawal from the service is covered by the amount of ink in the dedicated ink cartridge 121A of the color that is configured to most reduce the imbalance in the remaining amount of ink between the second colors. Therefore, while efficiently consuming ink, it is possible to perform printing for the amount of ink remaining in the ink cartridge 121 that was installed before the user subscribes to the service after the user withdraws from the service.

3. Third Embodiment

The third embodiment is different from the first embodiment and the second embodiment in that the multifunction machine memory 110 stores the non-dedicated remaining amount data of each of CMYK. In the third embodiment, when the non-dedicated ink cartridge 121B is installed in the multifunction machine 1, the print controller 103 updates the remaining amount of ink recorded on the IC chip 121C of the non-dedicated ink cartridge 121B every time the printing unit 12 performs printing. Furthermore, in the third embodiment, when the non-dedicated ink cartridge 121B is installed in the multifunction machine 1, the print controller 103 updates the remaining amount of ink indicated by the non-dedicated remaining amount data stored in the multifunction machine memory 110. In the third embodiment, the multifunction machine memory 110 corresponds to an example of a "storage unit".

In the third embodiment, since the non-dedicated remaining amount data is stored in the multifunction machine memory 110, the non-dedicated remaining amount data is not stored in the server memory 210. Therefore, the withdrawal information transmitted by the management server 2 does not include the non-dedicated remaining amount data group. When the withdrawal information is transmitted from the management server 2, the permission unit 102 of the third embodiment reads the non-dedicated remaining amount data stored in the multifunction machine memory 110 and executes the operation of FIG. 7.

As described above, the multifunction machine 1 that performs printing using the ink cartridge 121 includes the multifunction machine memory 110 that stores non-dedicated remaining amount data indicating the amount of ink remaining in the non-dedicated ink cartridge 121B that was installed in the multifunction machine 1 before the user subscribes the service, and the permission unit 102 that permits printing using the dedicated ink cartridge 121A according to the remaining amount of ink indicated by the non-dedicated remaining amount data stored in the multifunction machine memory 110 when the user P withdraws from the service.

According to this, the effects same as those of the service providing system 1000 of the first embodiment are achieved.

4. Other Embodiments

Each of the above-described embodiments shows only an aspect of the present disclosure, and any modification and application can be made within the scope of the present disclosure.

In each of the above-described embodiments, the multifunction machine 1 includes a serial type ink jet head, but the ink jet head included in the multifunction machine 1 is not limited to a serial type.

In each of the embodiments described above, the multifunction machine 1 is illustrated as an example of a printing apparatus, but the printing apparatus is not limited to the multifunction machine 1. The printing apparatus may be a device that does not have a scanning function, or a device that has another function such as a facsimile function.

In each of the embodiments described above, the ink jet method is exemplified as the printing method of the multifunction machine 1, but the printing method of the multifunction machine 1 is not limited to the ink jet method, and may be another printing method such as an electrophotographic method. Note that when the printing method of the multifunction machine 1 is an electrophotographic method, the toner cartridge installed in the multifunction machine 1 corresponds to an example of a "container", and the toner contained in the toner cartridge corresponds to an example of "printing material".

In each of the embodiments described above, the permission unit 102 is described as a functional unit of the multifunction machine processor 100. However, server processor 200 may function as the permission unit 102. In this configuration, the management server 2 transmits the content permitted by the permission unit 102 to the multifunction machine 1, and the multifunction machine 1 performs printing using the dedicated ink cartridge 121A within the range of the permitted content. In this embodiment, the management server 2 includes the providing unit 202 that delivers the dedicated ink cartridge 121A and the permission unit 102 that acquires the non-dedicated remaining amount data from the server memory 210 that stores the non-dedicated remaining amount data when the user withdraws from the service and permits the multifunction machine 1 to perform printing using the dedicated ink cartridge 121 according to the remaining amount of ink indicated by the non-dedicated remaining amount data. According to this, the effects same as those of the service providing system 1000 of the first embodiment are achieved.

The functions of the multifunction machine processor 100, the server processor 200, and the terminal processor 500 may be implemented by processors or a plurality of semiconductor chips.

The respective units shown in FIG. 2, FIG. 3, and FIG. 4 are an example, and is not particularly limited. It is not necessarily required to implement hardware corresponding to respective units, but it is of course possible to construct a configuration in which the functions of the respective units are implemented by executing a program by one processor. Part of the functions implemented by software may be implemented by hardware, or part of the functions implemented by hardware may be implemented by software. In addition, the specific detailed configurations of other units of the multifunction machine 1, the management server 2, and the terminal device 5 can be changed in any manner.

The operation step units shown in FIGS. 5, 6, 7, and 8 are divided in accordance with the main processing content in order to facilitate understanding of the operations of the respective devices of the service providing system 1000. Thus, the present disclosure is not limited by how the processing is divided into processing units or the names of the processing units. Depending on the processing content, the process may be divided into more steps. One step unit may be divided so as to include more processes. Moreover, the order of the steps may be changed as appropriate.

What is claimed is:

1. A service providing system that provides a service for delivering a container containing printing material used for a printing apparatus to perform printing, the service providing system comprising:

a providing unit configured to cause to be delivered a subscription container that is to physically replace a non-subscription container in the printing apparatus, the non-subscription container being installed in the printing apparatus before a subscription to the service begins;

a storage unit that stores remaining amount data indicating an amount of printing material remaining in the non-subscription container when the subscription is initiated; and a permission unit that is configured to permit, at a time of termination of the subscription to the service, the printing apparatus to perform printing using the subscription container according to a remaining amount indicated by the remaining amount data stored in the storage unit.

2. The service providing system according to claim 1, wherein the printing apparatus is configured to contain containers for printing materials of a plurality of colors including at least a first color and a second color, the remaining amount data being an initial remaining amount data for the first color, the subscription container being a subscription container for the first color, the non-subscription container being a non-subscription container for the first color, a non-subscription container for the second color also being installed in the printing apparatus before the subscription to the service begins, the providing unit also configured to cause to be delivered a subscription container for the second color that is to physically replace the non-subscription container for the second color;

the storage unit storing 1) the initial remaining amount data for the first color, 2) an initial remaining amount data for the second color indicating an amount of the printing material of the second color remaining in the non-subscription container for the second color when the subscription is initiated;

3) a subsequent remaining amount data for the first color which is an amount of printing material of the first color remaining in the subscription container for the first color at termination of the subscription; and 4) a subsequent remaining amount data for the second color which is an amount of printing material of the second color remaining in the subscription container for the color at termination of the subscription, wherein the subsequent remaining amount data for the first color is greater than the initial remaining amount for the first color, wherein the subsequent remaining amount for the second color is less than the initial remaining amount for the first color, whereby the permission unit permits to use the subscription container for the second color by an addition amount, wherein the addition amount is obtained by adding the initial remaining amount for the second color to a difference between the initial remaining amount for the first color and the subsequent remaining amount for the first color.

3. The service providing system according to claim 1, wherein when a remaining amount indicated by the remaining amount data is greater than an amount of printing material remaining in the second container when the subscription terminates, the providing unit delivers a new second container, and wherein when the providing unit delivers the new second container, the permission unit permits the printing apparatus to perform printing using the new second container by an amount corresponding to a difference between a remaining amount indicated by the remaining amount data and an amount of printing material remaining in the second container when the subscription terminates.

4. The service providing system according to claim 2, wherein the permissions unit is further configured to permit the use of the subscription container for the first color even after the termination of the subscription by an amount that the subsequent remaining amount for the second color exceeds the initial remaining amount for the second color, the amount further offset by the addition amount.

5. The service providing system according to claim 2, wherein when there is the plurality of second colors, the permission unit determines that a second color with a largest usage amount in the printing apparatus is a second color that is permitted to use by the addition amount.

6. The service providing system according to claim 2, wherein when there is the plurality of second colors, the permission unit determines that a second color that is configured to most reduce an imbalance in a remaining amount between the second colors is a second color that is permitted to use by the addition amount.

7. A service providing device that provides a service for delivering a container containing printing material used for a printing apparatus to perform printing to a user of the printing apparatus, the service providing device comprising:

a providing unit configured to cause to be delivered a subscription container that is to physically replace a non-subscription container in the printing apparatus, the non-subscription container being installed in the printing apparatus before a subscription to the service begins; and a permission unit that acquires, from a storage unit that stores remaining amount data indicating an initial amount of printing material remaining in the non-subscription container when the subscription is initiated, subsequent remaining amount data remaining when the subscription to the service is terminated, and permits the printing apparatus to perform printing using the subscription container according to the initial remaining amount indicated by the remaining amount data.

8. A printing apparatus that performs printing using a subscription container containing printing material, the printing apparatus comprising: a storage unit that stores remaining amount data indicating a remaining amount when a user of the printing apparatus subscribes to a service for replacing a non-subscription container, the remaining amount being an amount of printing material contained in the non-subscription container that is a container that was installed in the printing apparatus before the user subscribes to a service; and a permission unit that permits, at a time of termination of the subscription to withdrawal from the service, printing using the subscription container that is a container to be installed in place of the non-subscription container according to a remaining amount indicated by the remaining amount data stored in the storage unit.

* * * * *